US00RE46893E

(19) United States
(12) Reissued Patent
Helwig et al.

(10) Patent Number: US RE46,893 E
(45) Date of Reissued Patent: Jun. 19, 2018

(54) INPUT DEVICE

(71) Applicant: Logitech Europe S.A., Lausanne (CH)

(72) Inventors: Marten Helwig, Bern (CH); Katharine Pulford, Lausanne (CH); Cathal Loughnane, Co. Wexford (IE); James Lynch, Co. Dublin (IE); Michael Nolan, Thomastown (IE); Padraig McLoughlin, Co. Monogham (IE); Tommy Zhu, Suzhou (CN)

(73) Assignee: Logitech Europe S.A., Lausanne (CH)

(21) Appl. No.: 29/599,551

(22) Filed: Apr. 4, 2017

Related U.S. Patent Documents

Reissue of:
(64) Patent No.: Des. 768,633
Issued: Oct. 11, 2016
Appl. No.: 29/529,125
Filed: Jun. 3, 2015

(51) LOC (11) Cl. ..... 14-02
(52) U.S. Cl.
USPC ..... D14/402
(58) Field of Classification Search
USPC ..... D14/402–411, 356, 388, 389, 383–385, D14/417, 426; 345/156–167; 463/36–38; 358/471, 473; 273/148 B
CPC ..... G06F 3/03543; G06F 2203/0333; G06F 3/039; G06F 3/038; G06F 2203/0384
See application file for complete search history.

(56) References Cited

U.S. PATENT DOCUMENTS

D411,189 S * 6/1999 Liao et al. ..... D14/409
D614,187 S * 4/2010 Blanchard ..... D14/402
D618,684 S * 6/2010 Ng ..... D14/402
D627,355 S * 11/2010 Blanchard ..... D14/402
D665,392 S * 8/2012 Jost ..... D14/409
D667,409 S * 9/2012 Kujawski ..... D14/409
D680,113 S * 4/2013 Li ..... D14/409
D688,245 S * 8/2013 Guerra ..... D14/409
D688,664 S * 8/2013 Guerra ..... D14/409
(Continued)

*Primary Examiner* — Phillip S Hyder
(74) *Attorney, Agent, or Firm* — Kilpatrick, Townsend & Stockton, LLP

(57) CLAIM

The ornamental design for input device, as shown and described.

DESCRIPTION

FIG. 1 is a perspective view of a first embodiment of an input device showing our new design;
FIG. 2 is a second perspective view thereof;
FIG. 3 is a third perspective view thereof;
FIG. 4 is a top plan view thereof;
FIG. 5 is a bottom plan view thereof;
FIG. 6 is a front elevational view thereof;
FIG. 7 is a rear elevational view thereof;
FIG. 8 is a right side elevational view thereof; and
FIG. 9 is a left side elevational view thereof.
FIG. 10 is a perspective view of a second embodiment of an input device showing our new design;
FIG. 11 is a second perspective view thereof;
FIG. 12 is a third perspective view thereof;
FIG. 13 is a top plan view thereof;
FIG. 14 is a bottom plan view thereof;
FIG. 15 is a front elevational view thereof;
FIG. 16 is a rear elevational view thereof;
FIG. 17 is a right side elevational view thereof; and,
FIG. 18 is a left side elevational view thereof.
Perspective views are not drawn to scale. The broken lines shown represent unclaimed subject matter and form no part of the claimed design.

1 Claim, 10 Drawing Sheets

Figure 1:
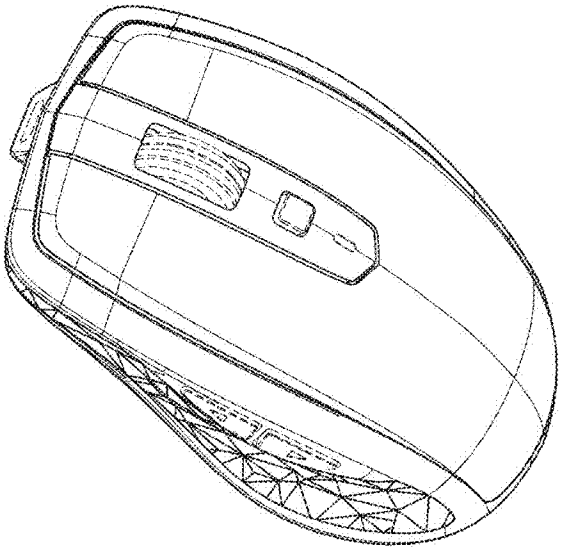
Figure 2:
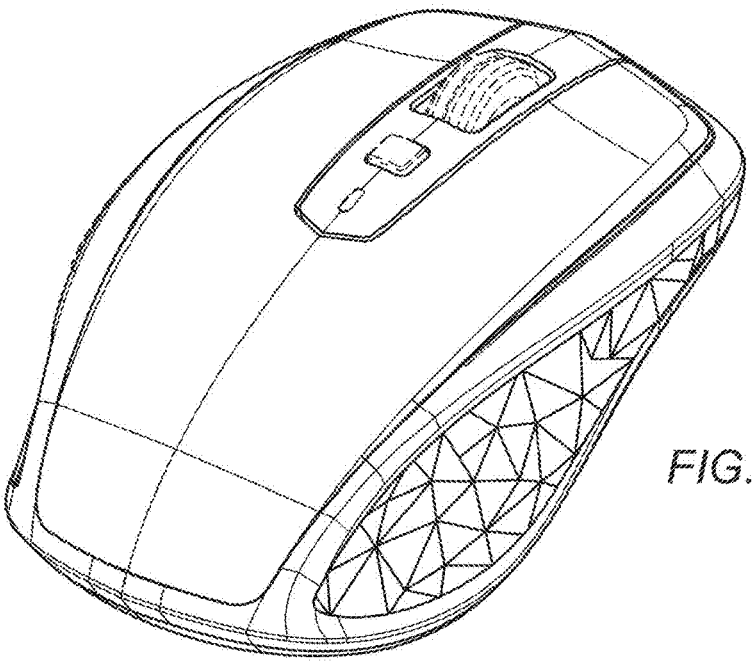
Figure 3:
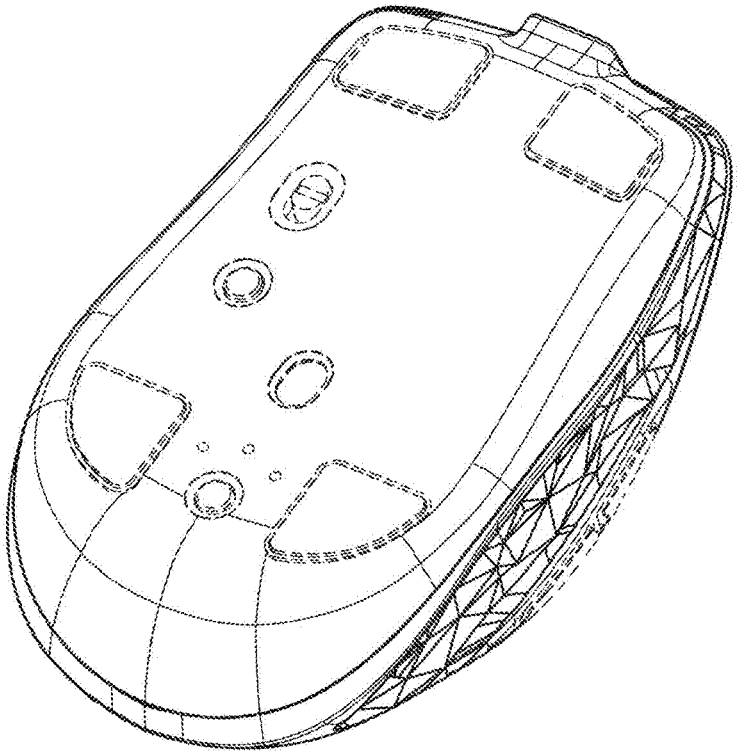
Figure 4:
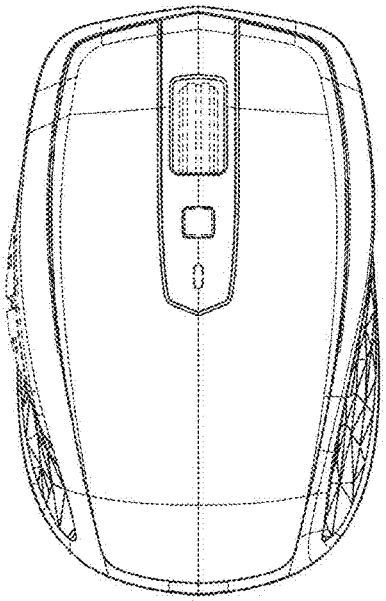
Figure 5:
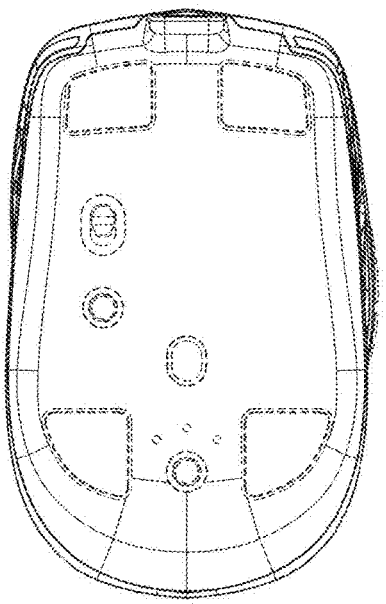
Figure 6:
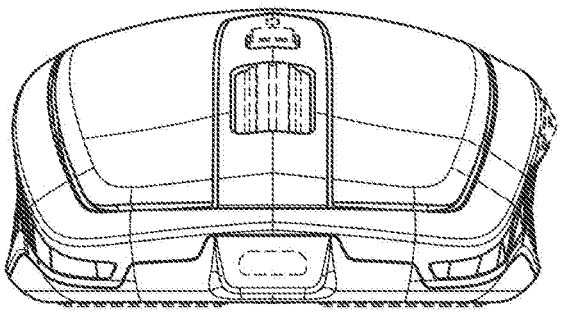
Figure 7:
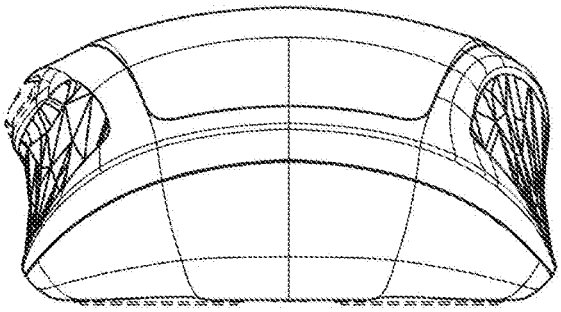
Figure 8:
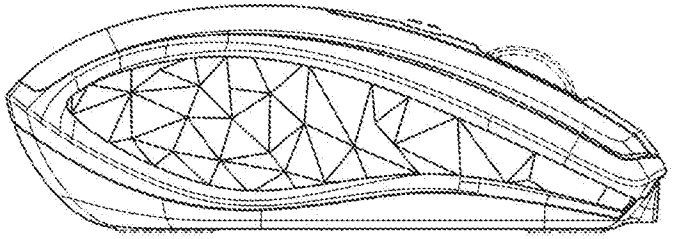
Figure 9:
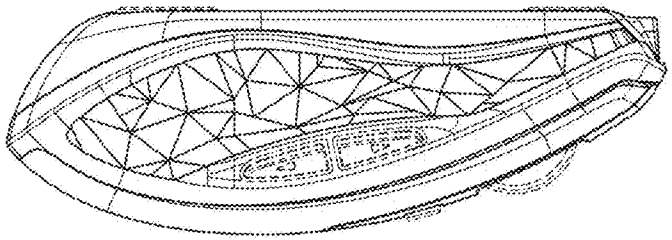
Figure 10:
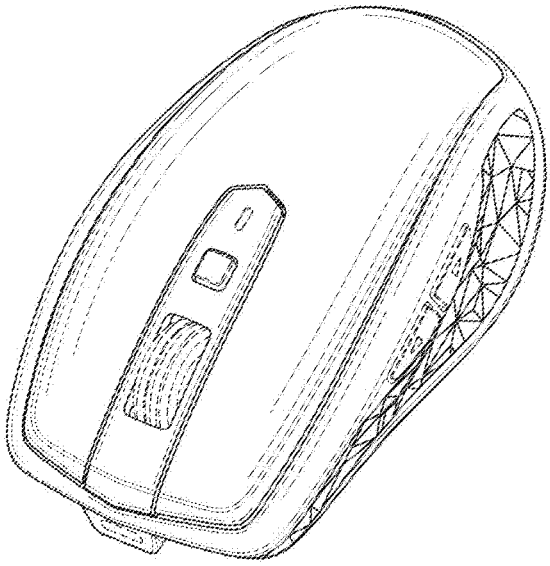
Figure 11:
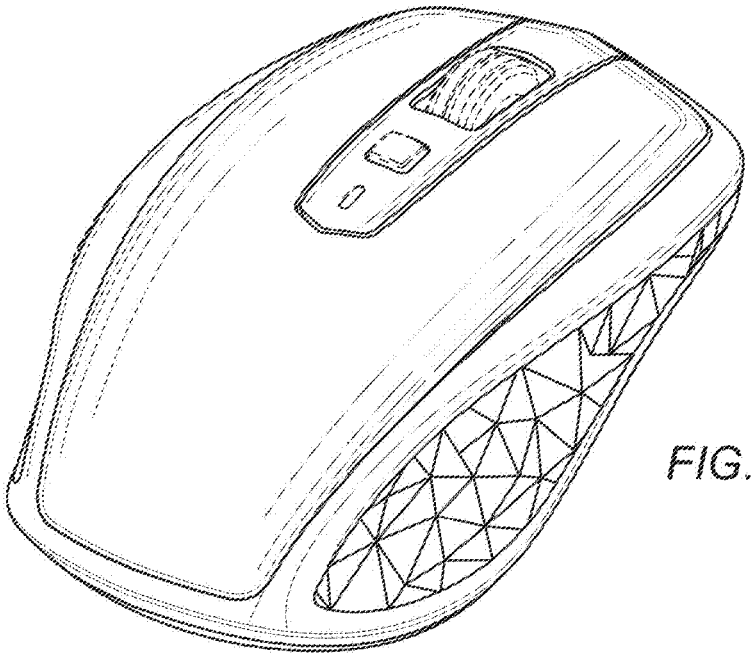
Figure 12:
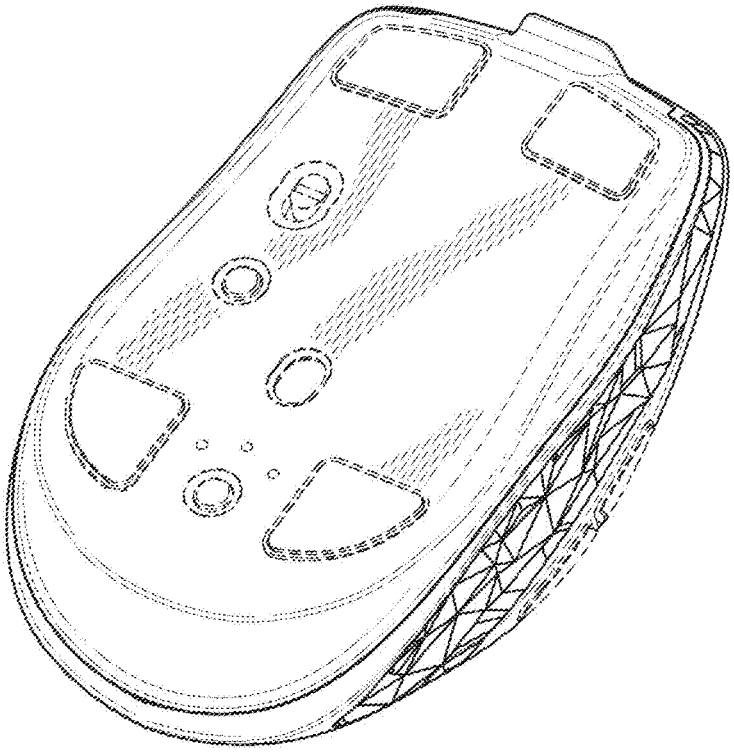
Figure 13:
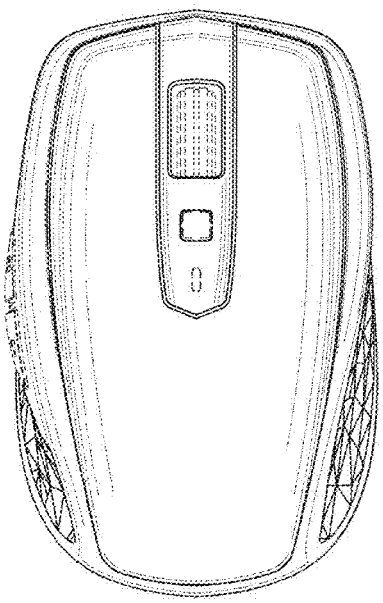
Figure 14:
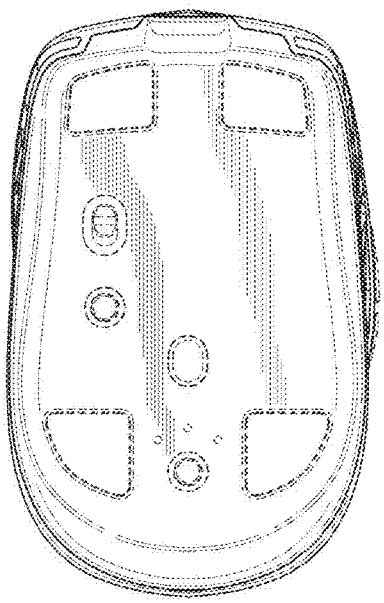
Figure 15:
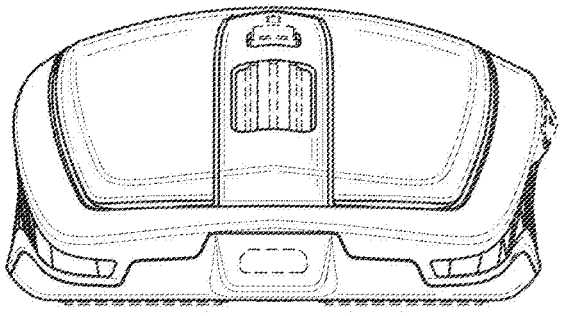
Figure 16:
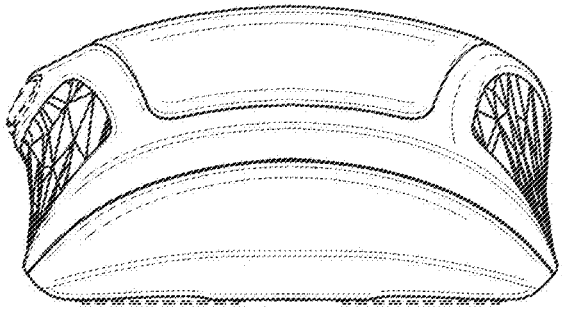
Figure 17:
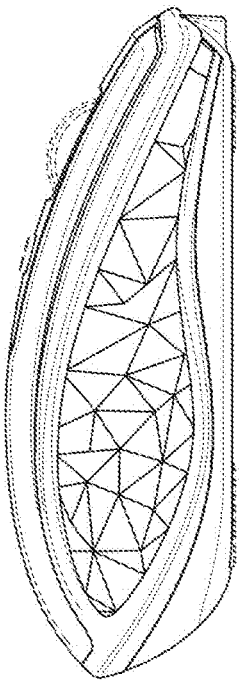
Figure 18:
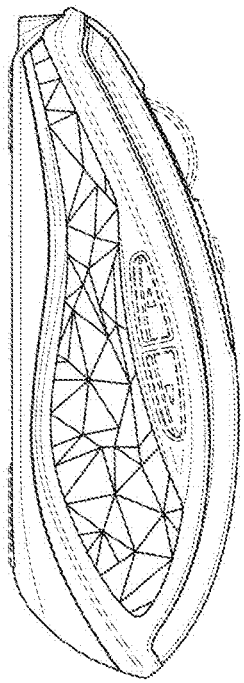

Matter enclosed in heavy brackets [ ] appears in the original patent but forms no part of this reissue; matter printed in italics indicates the additions made by reissue.

(56) References Cited

U.S. PATENT DOCUMENTS

| | | | | | |
|---|---|---|---|---|---|
| D712,903 | S | * | 9/2014 | Lai | D14/409 |
| D744,485 | S | * | 12/2015 | Young | D14/409 |
| 2004/0233169 | A1 | * | 11/2004 | Willat | G06F 3/03543 345/163 |
| 2009/0046064 | A1 | * | 2/2009 | Manalo | G06F 3/03543 345/164 |

* cited by examiner